US011794922B1

(12) United States Patent
Twyford et al.

(10) Patent No.: US 11,794,922 B1
(45) Date of Patent: Oct. 24, 2023

(54) MOBILE UAV NEST

(71) Applicant: WING Aviation LLC, Mountain View, CA (US)

(72) Inventors: Evan Twyford, Houston, TX (US); Thorsten Schilling, San Jose, CA (US); Jesse Blake, Palo Alto, CA (US); Scott Velez, Redwood City, CA (US); James Schmalzried, San Jose, CA (US); Ray Leung, Fremont, CA (US); Greg Vulikh, Redwood City, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

(21) Appl. No.: 17/881,438

(22) Filed: Aug. 4, 2022

(51) Int. Cl.
*B64F 1/00* (2006.01)
*B64C 39/02* (2023.01)
*B64U 80/70* (2023.01)

(52) U.S. Cl.
CPC ............ *B64F 1/007* (2013.01); *B64C 39/024* (2013.01); *B64U 80/70* (2023.01)

(58) Field of Classification Search
CPC .......... B64F 1/005; B64F 1/007; B64F 1/222; B64F 1/00; B64F 1/22; B64U 80/00; B64U 70/90; B64U 70/92
See application file for complete search history.

(56) References Cited

U.S. PATENT DOCUMENTS

| | | |
|---|---|---|
| 8,511,606 B1 | 8/2013 | Lutke et al. |
| 9,305,280 B1 | 4/2016 | Berg et al. |
| 9,346,560 B2 | 5/2016 | Wang |

(Continued)

FOREIGN PATENT DOCUMENTS

| | | | |
|---|---|---|---|
| CN | 114954984 A | * | 8/2022 |
| KR | 20140115024 A | | 9/2014 |

(Continued)

OTHER PUBLICATIONS

Search Report and Written Opinion dated Sep. 26, 2019 for corresponding International Patent Application No. PCT/US2019/036840, 8 pages.

(Continued)

*Primary Examiner* — Richard G Davis
(74) *Attorney, Agent, or Firm* — Christensen O'Connor Johnson Kindness PLLC

(57) ABSTRACT

A mobile nest for unmanned aerial vehicles (UAVs) includes a cuboid-shaped frame, staging pads, charging electronics, and exterior siding. The cuboid-shaped frame includes vertical supports positioned at corners of the cuboid-shaped frame. The staging pads are adapted for landing, launching, and charging the UAVs. The staging pads are mounted to pivot about two or more of the vertical supports. Each of the staging pads rotates into the cuboid-shaped frame when stowed and rotates out of the cuboid-shaped frame when deployed for launching or landing the corresponding one of the UAVs. The charging electronics are disposed within the cuboid-shaped frame and coupled to the staging pads to charge the UAVs when the UAVs are positioned on the staging pads. The exterior siding is mounted to the cuboid-shaped frame to provide a weather barrier that protects the UAVs from weather when the UAVs are stowed within the mobile housing structure.

22 Claims, 8 Drawing Sheets

(56) References Cited

U.S. PATENT DOCUMENTS

| | | | |
|---|---|---|---|
| 9,527,605 | B1 | 12/2016 | Gentry et al. |
| 9,777,502 | B2 * | 10/2017 | Curlander ............. B64C 39/024 |
| 10,730,626 | B2 | 8/2020 | Gil et al. |
| 2015/0336669 | A1 | 11/2015 | Kantor et al. |
| 2016/0144982 | A1 * | 5/2016 | Sugumaran ............ A01D 41/12 244/108 |
| 2017/0144776 | A1 | 5/2017 | Fisher et al. |
| 2017/0225802 | A1 | 8/2017 | Lussier |
| 2017/0240061 | A1 | 8/2017 | Waters |
| 2018/0141682 | A1 | 5/2018 | Blake et al. |
| 2019/0002127 | A1 * | 1/2019 | Straus .................. G08G 5/0091 |
| 2019/0002128 | A1 * | 1/2019 | Raz ....................... B64C 39/024 |
| 2019/0023416 | A1 * | 1/2019 | Borko ........................ B66C 7/08 |
| 2019/0070995 | A1 * | 3/2019 | Cantrell ................. B60P 3/007 |
| 2019/0383052 | A1 | 12/2019 | Blake et al. |

FOREIGN PATENT DOCUMENTS

| | | |
|---|---|---|
| RU | 97112 A | 8/2010 |
| RU | 2593207 A | 8/2016 |
| WO | 2016205415 A1 | 12/2016 |
| WO | 2017029611 A1 | 2/2017 |
| WO | WO-2017029611 A1 * | 2/2017 ........... B64C 39/024 |
| WO | 2017109780 A1 | 6/2017 |

OTHER PUBLICATIONS

Australian Examination Report, dated Aug. 5, 2021, in corresponding Australian Patent Application No. 2019284919, 5 pages.

Australian Examination Report, dated Nov. 3, 2021, in corresponding Australian Patent Application No. 2019284919, 5 pages.

Extended European Search Report, dated Jan. 27, 2022, in corresponding European Patent Application No. 19819385.6-1010, 7 pages.

Search Report and Written Opinion, dated Mar. 28, 2022, in corresponding Singapore Patent Application No. 11202012057U, 8 pages.

* cited by examiner

MOBILE UAV NEST

TECHNICAL FIELD

This disclosure relates generally to unmanned aerial vehicles (UAVs), and in particular but not exclusively, relates to mobile nests for mobile staging of UAV fleets.

BACKGROUND INFORMATION

An unmanned vehicle, which may also be referred to as an autonomous vehicle, is a vehicle capable of travel without a physically present human operator. Various types of unmanned vehicles exist for different environments. For instance, unmanned vehicles exist for operation in the air, on the ground, underwater, and in space. Unmanned vehicles also exist for hybrid operations in which multi-environment operation is possible. Unmanned vehicles may be provisioned to perform various missions, including payload delivery, exploration/reconnaissance, imaging, public safety, surveillance, or otherwise. The mission definition will often dictate a type of specialized equipment and/or configuration of the unmanned vehicle.

Controlling unmanned vehicles can be problematic especially when there are a large number of vehicles in close proximity. For unmanned aerial vehicles (UAVs), the terminal area from which the UAVs are staged (e.g., arrival and departure location) can be a high congestion choke point. Accordingly, techniques and systems that enable deployment of smaller fleets of UAVs in a dispersed or distributed manner alleviates the congestion problem. In parcel delivery applications, small, dispersed deployments of UAVs that are closer to the merchants using the aerial delivery service and also closer to the customers that receive the parcels can provide additional benefits including low latency deliveries, increased delivery throughput, and potentially higher market adoption.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for a mobile nest configured for transporting, staging, and charging unmanned aerial vehicles (UAVs) in a compact and readily transported form factor are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Conventionally, aircraft that provide commercial services are staged from terminal areas where they are directly supervised by on-site attendants/ground crew. Due to the conglomeration of arrives and departures, these terminal areas can be congested causing increased logistical challenges and can be noisy resulting in terminal areas being pushed further out into less inhabited areas. For a UAV package delivery service, conventional terminal areas are not ideal as the merchants that want to use the service need to setup remote operations adjacent to the terminal area away from their primary places of business. If the terminal area is placed in remote locations, such as commercial or rural districts, this may alleviate noise and congestion concerns, but does so at the expense of increased flight times to the customers, reducing delivery throughputs, and potentially being out of range for some urban or suburban customers.

Figure 1A:
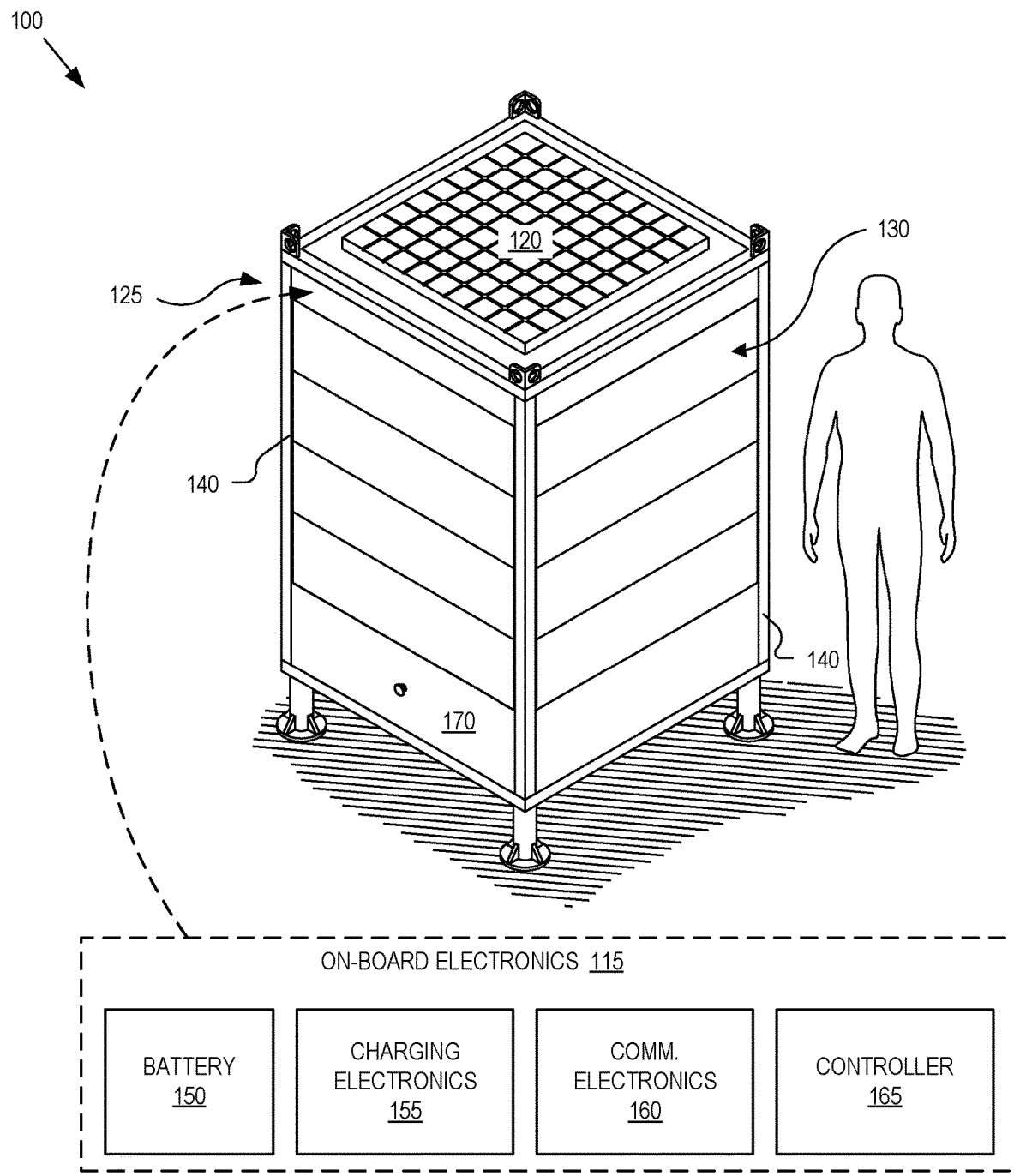
FIG. 1A is a perspective view illustration of a mobile nest for transporting, storing, and staging unmanned aerial vehicles (UAVs), in accordance with an embodiment of the disclosure.
Figure 1B:
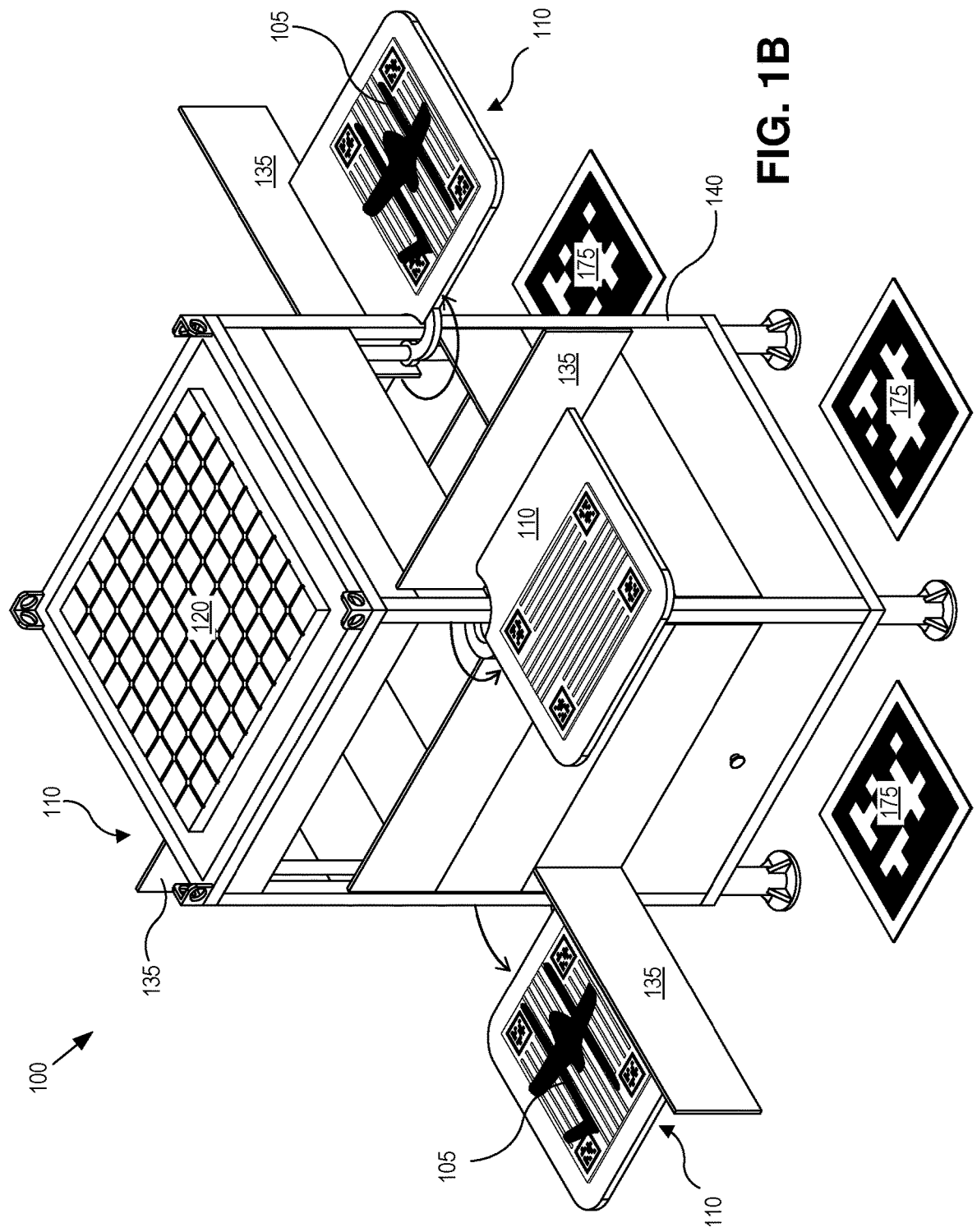
FIG. 1B is a perspective view illustration of the mobile nest with four staging pads deployed for landing, launch, and/or charging the UAVs, in accordance with an embodiment of the disclosure.

FIGS. 1A and 1B illustrate a mobile nest 100 for transporting, storing, staging, and charging UAVs 105, in accordance with an embodiment of the disclosure. Mobile nest 100 is a mobile or portable housing structure in a compact form factor that facilities quick deployment and staging of UAVs 105 to remote locations that may be temporary or semi-permanent staging locations. FIG. 1A is a perspective view illustration of mobile nest 100 in a closed configuration with UAVs 105 and staging pads 110 stowed, while FIG. 1B is a perspective view illustration of the same in an open configuration with staging pads 110 deployed for launching/landing UAVs 105.

The illustrated embodiment of mobile nest 100 includes a housing for protecting/storing, charging, and staging UAVs 105 from staging pads 110, on-board electronics 115, and a solar panel 120. The illustrated embodiment of the housing includes a cuboid-shaped frame 125 with exterior siding 130 providing a weather barrier for protecting UAVs 105 from the elements when UAVs 105 are stowed within mobile nest 100. The housing also serves to provide security to UAVs 105 when stowed.

As illustrated in FIG. 1B, each staging pad 110 is mounted to a staging pad bracket 135 that extends from a hinge, which pivots the staging pad 110 about a vertical support 140 of cuboid-shaped frame 125. In the illustrated embodiment, staging pad brackets 135 also form a portion of exterior siding 130 providing the weather barrier for mobile nest 100.

The illustrated embodiment of cuboid-shaped frame 125 includes four vertical supports 140 positioned at corners of the cuboid-shaped frame 125. Vertical supports 140 are interconnected at the top and bottom via horizontal supports. The bottom of vertical supports 140 include support feet (e.g., pads, casters, rollers, etc.) while the top may optionally include lifting hooks for foisting mobile nest 100 on and off a delivery truck or trailer for transport. Mobile nest 100 provides a convenient, compact form factor for easy, quick deployment of small or dispersed UAV fleets. Mobile nest 100 may be stackable and/or modular (e.g., include a variable number of staging pads 110).

Each mobile nest 100 may include the necessary electronics to provide local command and control, battery charging, or otherwise. For example, on-board electronics 115 may include a battery 150, charging electronics 155, communication electronics 160, and a controller 165. Battery 150 may be charged via solar panel 120 (or secondary flip out/flip up solar panels discussed below) using charging electronics 155. The charging electronics 155 may then use the energy stored in on-board battery 150 to charge UAVs 105. Additionally/alternatively, charging electronics 155 may directly recharge UAVs 105 from solar panel 120 or use shore power if available. Controller 165 includes data storage and one or more processors to orchestrate the operation of the other components. When UAVs 105 returns to mobile nest 100, their flight data may be downloaded to the data storage and temporarily buffered while it is uploaded to a cloud-based command and control via communication electronics 160. Communication electronics 160 may include a wired LAN adapter, a wireless LAN adapter, one or more wireless cellular adapters, any combination of these, or otherwise.

In the illustrated embodiment, mobile nest 100 includes a drawer/cabinet 170 for storage. For example, drawer 170 may be used to store visual fiducial markers 175 that are deployed on or about mobile nest 100 to aid visual navigation of UAVs 105 in the vicinity of mobile nest 100. These visual fiducial markers may be high contrast images (e.g., quick response codes) printed on a placeable mat. Smaller versions of the visual fiducial markers may also be integrated onto staging pads 110 for close in navigation, while the larger mat based visual fiducial markers are dispersed about mobile nest 100 for higher altitude navigation. In some embodiments, light emitters (e.g, infrared emitters) may also be integrated into the housing and/or staging pads 110. In yet other embodiments, the top side of the housing (e.g., the top horizontal supports) may be painted with high contrast colors and/or include integrated IR emitters to aid visual navigation by UAVs 105. Drawer 170 may securely store some or all of on-board electronics 115. In other embodiments, on-board electronics 115 may be housed higher up in mobile nest 120 immediately below solar panel 120. Of course, drawer 170 may also store other components or items such as UAV replacement parts, tools, etc.

Figure 2A:
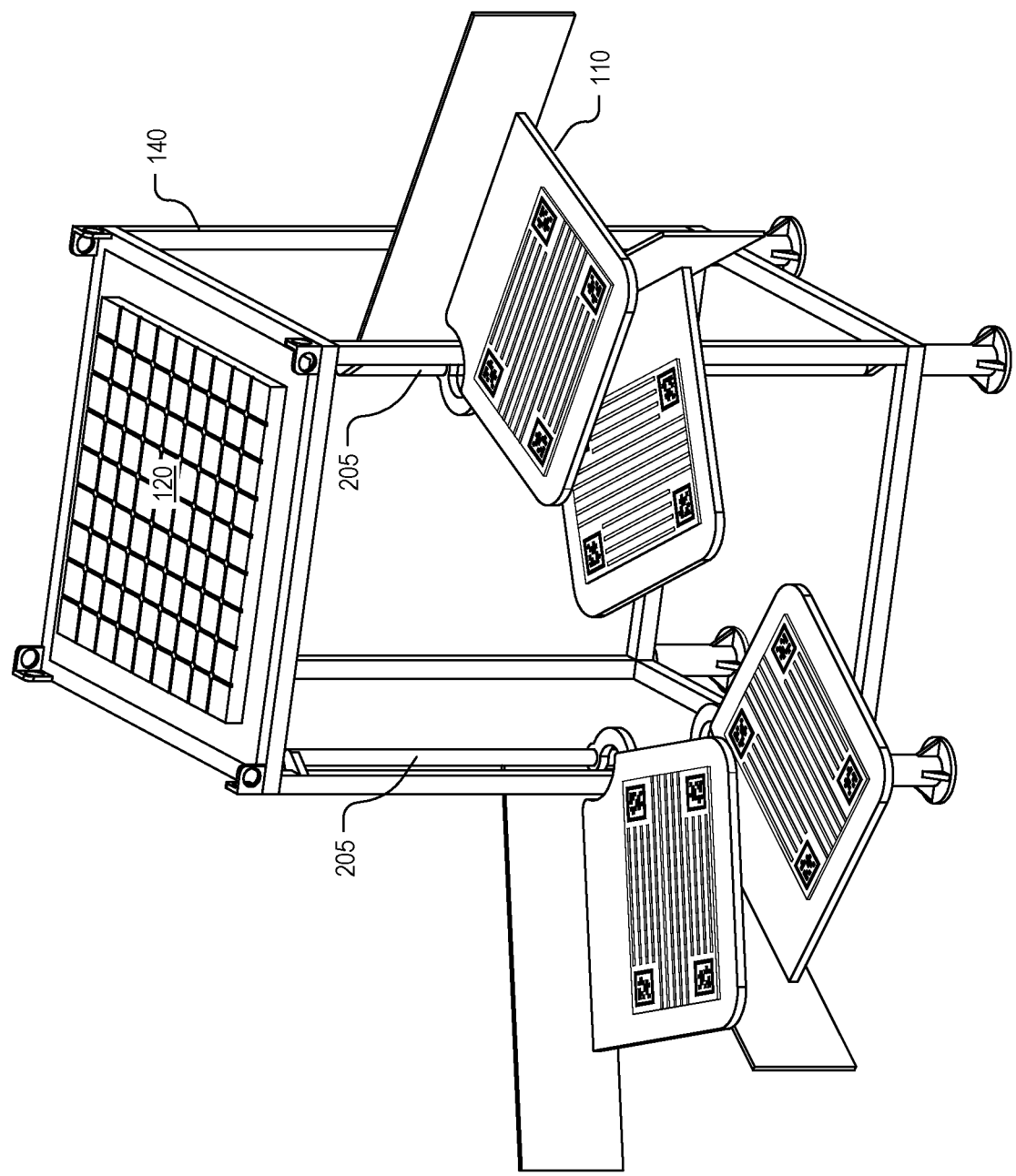
FIG. 2A is a side perspective view illustration of a cuboid-shaped frame for the mobile nest including two staging pads pivotally mounted to each corner, in accordance with an embodiment of the disclosure.

FIG. 1B illustrates an embodiment of mobile nest 100 including four staging pads 110—one per vertical support 140. In other embodiments, each vertical support 140 may include two staging pads 110 (e.g., an upper and lower staging pad as illustrated in FIG. 2A). In one higher density embodiment, mobile nest 100 may include eight staging pads 110, but may only have enough vertical height within cuboid-shaped frame 125 to physically house four UAVs 105. In this higher density embodiment, more staging pads 110 may be deployed for daytime use (e.g., landing, launching, charging) than the mobile nest 100 can actually securely stow within its protective housing. This higher density embodiment facilitates daytime surges where a portion of the deployed fleet returns to a remote location for overnight storage. This enables waypoint charging whereby each mobile nest 100 has a limited number of staging pads 110 open and available for UAVs 105 that are passing through on their way to a further destination.

Figure 2B:
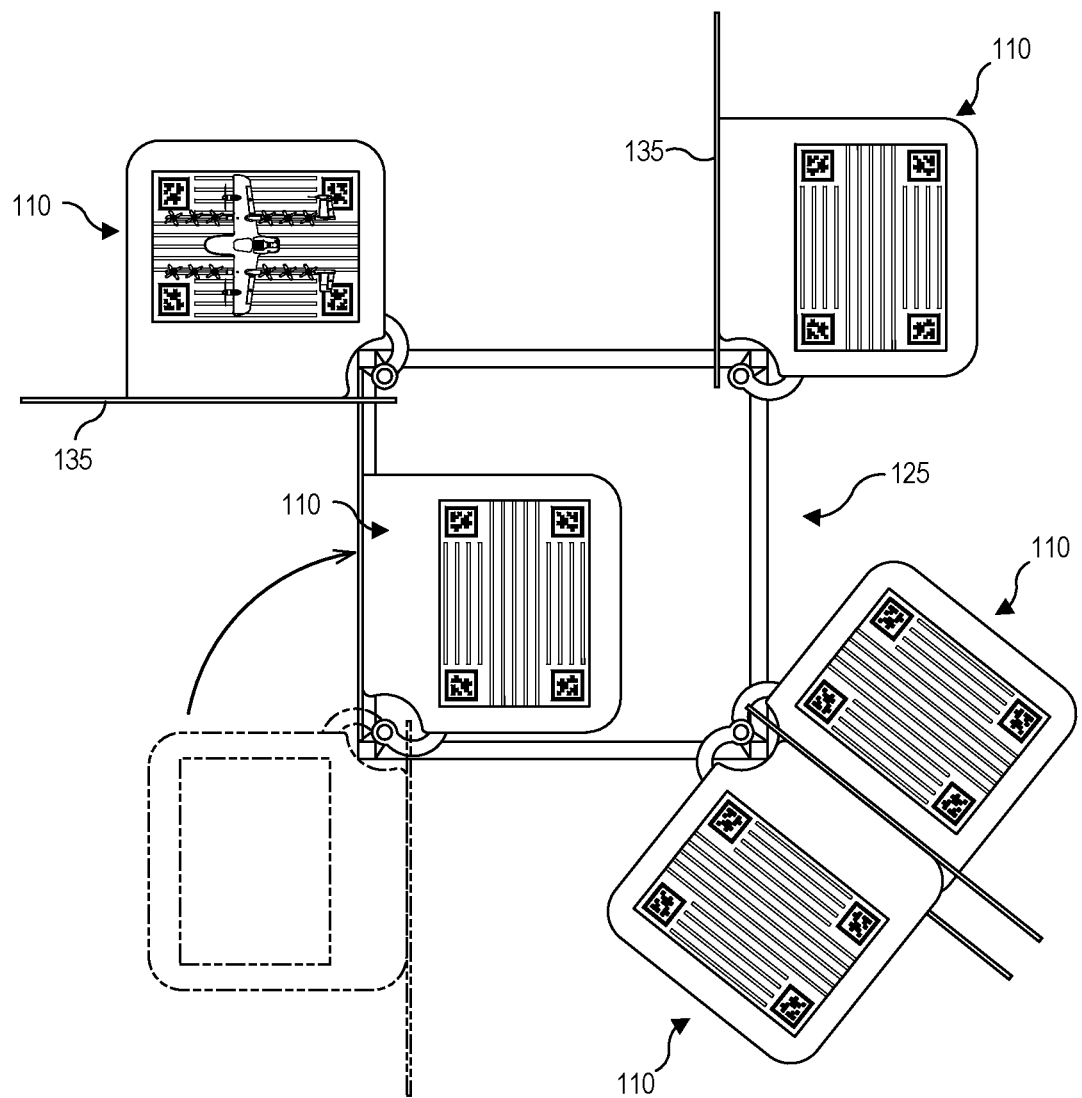
FIG. 2B is a plan view illustration of the mobile nest including two staging pad pivotally mounted to each corner of the cuboid-shaped frame, in accordance with an embodiment of the disclosure.

FIGS. 2A and 2B illustrate a mobile nest 200 including two staging pads 110 pivotally mounted to each corner of cuboid-shaped frame 125, in accordance with an embodiment of the disclosure. FIG. 2A is a side perspective view illustration without the weather siding illustrated so as not to obscure the relevant details of the cuboid-shaped frame, while FIG. 2B is a top side view of the same. Mobile nest 200 is one possible implementation of mobile nest 100, but potentially including up to eight staging pads 110 instead of four.

In the illustrated embodiment, staging pads 110 are mounted to hinges, which in turn connect to sliding hinges adapted to slide up and down sliding guides 205 and pivot abut a corresponding one of vertical supports 140. In the illustrated embodiment, sliding guides 205 are cylindrical bars incorporated with, or connected to, vertical supports 140. Sliding guides 205 enable the vertical offset between the various staging pads 110 to be adjusted or moved to different positions between the deployed and stowed positions of staging pads 110. FIG. 2B illustrates how two staging pads 110 may be mounted to pivot about a single vertical support 140. When deployed, staging pads 110 are deployed out to the diagonal corners providing an unobstructed vertical flight column immediately above each staging pad 110.

Figure 3A:
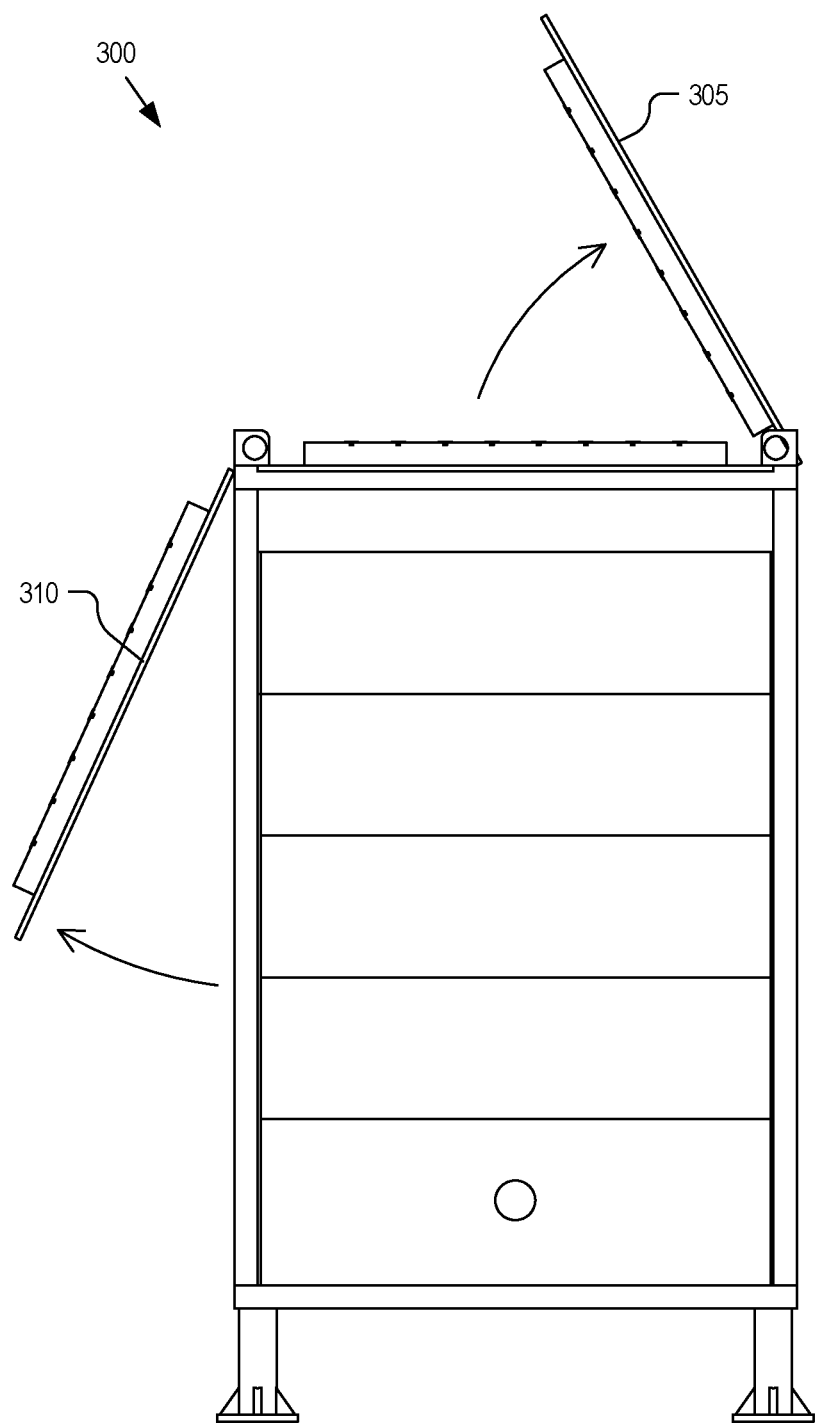
FIG. 3A illustrates how flip-out or flip-up flaps may be mounted to sides of the mobile nest to deploy secondary solar panels or visual fiducial markers, in accordance with an embodiment of the disclosure.
Figure 3B:
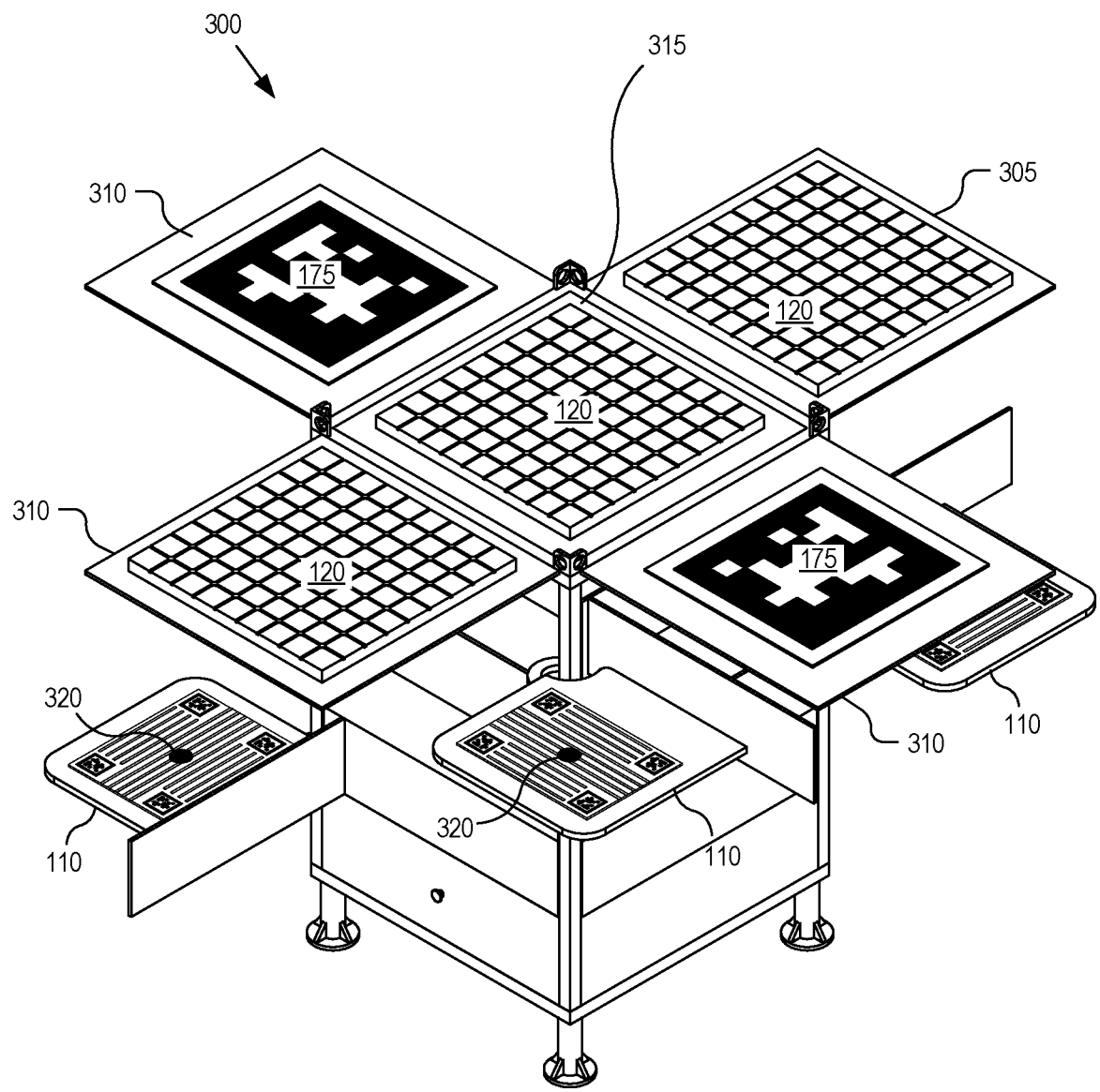
FIG. 3B illustrates a mobile nest with staging pads and flaps deployed, in accordance with an embodiment of the disclosure.

FIGS. 3A and 3B illustrate how flip-out flaps 305 or flip-up flaps 310 may be mounted to sides of a mobile nest 300 to deploy secondary solar panels or visual fiducial markers 175, in accordance with an embodiment of the disclosure. FIG. 3A is a side view illustration of mobile nest 300 while FIG. 3B is a top plan view illustration of the same. Mobile nest 300 is one possible implementation of mobile nest 100.

FIG. 3A illustrates how the flaps may be implemented as flip-out flaps 305 that cover the topside of mobile nest 300 when stowed, and then expose the topside including solar panel 120 when deployed. Flip-out flaps 305 are pivotally mounted to a side of the top of the cuboid-shaped frame. Mobile nest 300 may include one, two, three, or even four flip-out flaps 305. Alternatively (or additionally), mobile nest 300 may include flip-up flaps 310 that each cover a side of mobile nest 300 when stowed, and then expose the corresponding side to permit staging pads 110 to pivot out when deployed. Flip-up flaps 310 are also pivotally mounted to a side of the top of the cuboid-shaped frame. Mobile nest 300 may include one, two, three, or even four flip-up flaps 310. Of course, mobile nest 300 may exclusively include flip-out flaps 305, exclusively include flip-up flaps 310, or include a combination of both types of flaps mounted to the various sides of mobile nest 300.

FIG. 3B illustrates flip-up flap 305 and flip-out flaps 310 as carrying visual fiducial markers 175 to provide visual navigation aids to UAVs 105. Additionally (or alternatively), the topside 315 of the cuboid-shaped frame may be painted with a high contrast pattern to further aid visual identification and tracking of mobile nest 300 by UAVs 105.

In various other embodiments, one or more (or all) of the flaps may carry a secondary solar panel to provide additional solar power to battery 150 and/or directly to UAVs 105. For example, two of the flaps may each carry a secondary solar panel while two of the flaps may each carry a corresponding visual fiducial marker 175.

FIG. 3B further illustrates how flaps 305 or 310 flip out/up along sides of mobile nest 300 while staging pads 110 deploy by pivoting out to diagonal corners of the cuboid-shape frame between the flaps. This configuration provides unobstructed vertical flight columns above each deployed staging pad 110 and provides unobstructed views of visual fiducial markers 175 from above. Similarly, if flaps 305/310 carry secondary solar panels, these secondary solar panels along with the primary solar panel 120 have full sun exposure.

Finally, FIG. 3B further illustrates that staging pads 110 need not be implemented as simple flat surfaces with charging electrodes. Rather, staging pads 110 may also include three-dimensional (3D) shapes that operate as physical registration features 320 between the staging pad 110 and the UAV 105. For example, the registration feature may be a 3D shape (e.g., male coupler) that mates to a corresponding registration feature (e.g., female receiver) on each of the UAVs 105. These 3D registration features can help locate and secure the UAVs 105 to a staging pad 110 when landed. In some embodiments, the 3D registration features may be saddle-like features or harnesses that hold UAVs 105 and obviate the need for a flat landing pad surface. Accordingly, staging pads 110 may assume a variety of shapes, sizes, and configurations for holding and charging UAVs 105.

Figure 4:
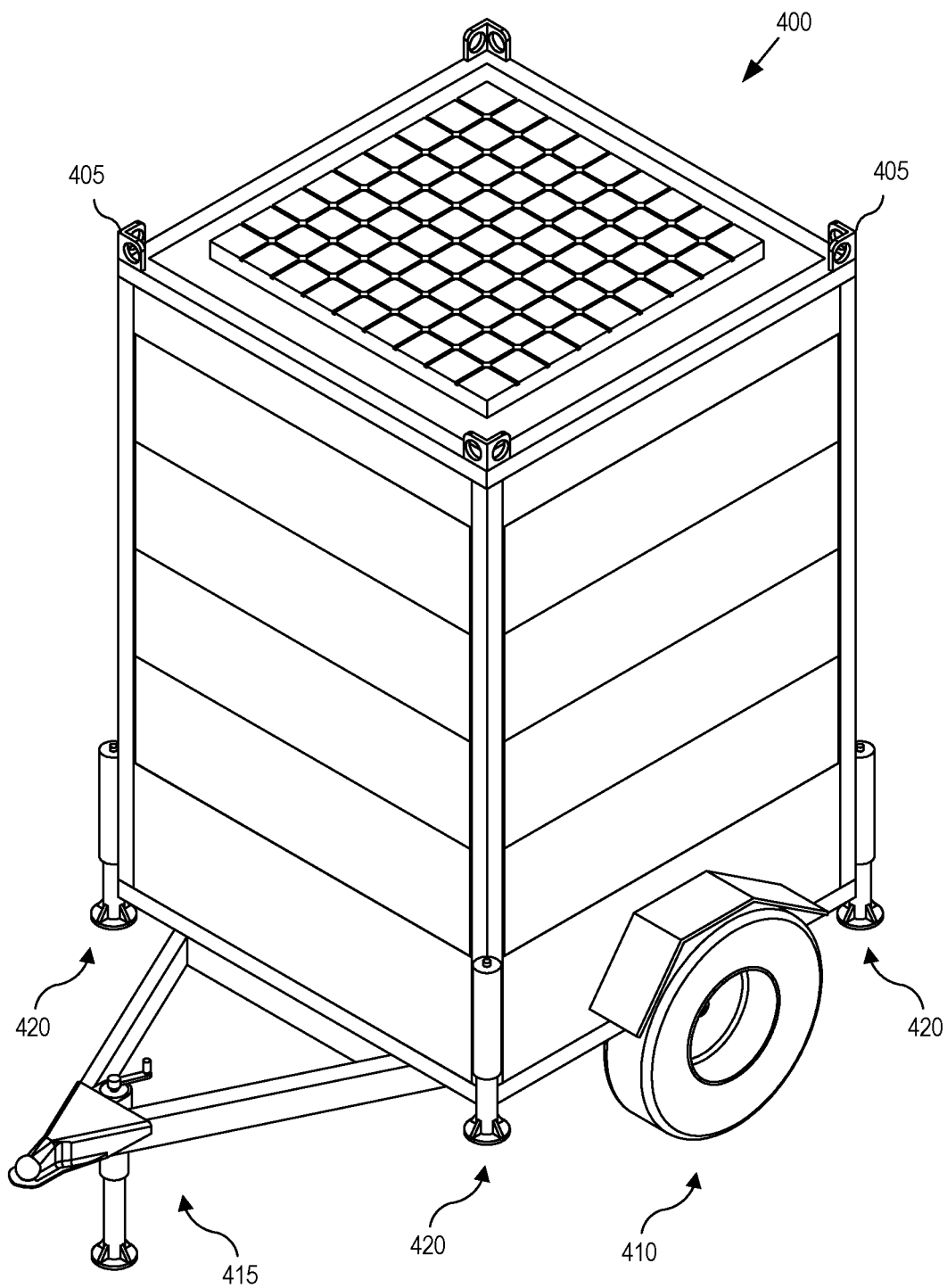
FIG. 4 illustrates a mobile nest with various mobility features, in accordance with an embodiment of the disclosure.

FIG. 4 illustrates a mobile nest 400 configured with various features to aid mobility, in accordance with an embodiment of the disclosure. Mobile nest 400 is yet another possible implementation of mobile nest 100. The illustrated embodiment of mobile nest 400 includes lifting hooks 405 for foisting mobile nest 400 into position with a crane or boom. Mobile nest 400 further includes wheels 410 and a hitch 415 for trailering mobile nest 400 to staging locations. Finally, mobile nest 400 may also include leveling jacks 420 for stabilizing and leveling mobile nest 400 during remote field operations on uneven ground.

Figure 5A:
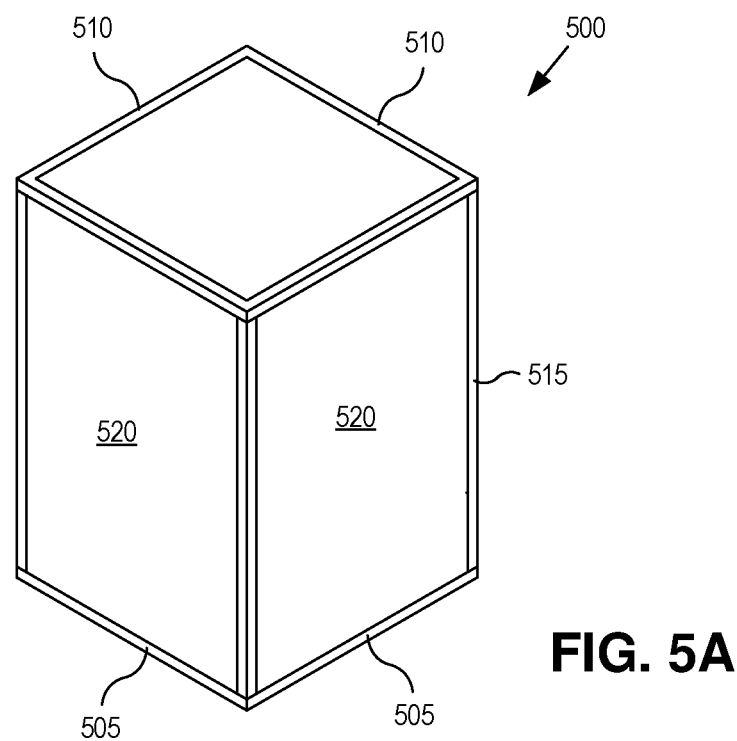
FIGS. 5A and 5B illustrate a mobile nest with sides that pivot down to expose UAVs stowed on a rack within a cuboid-shaped frame, in accordance with an embodiment of the disclosure.
Figure 5B:
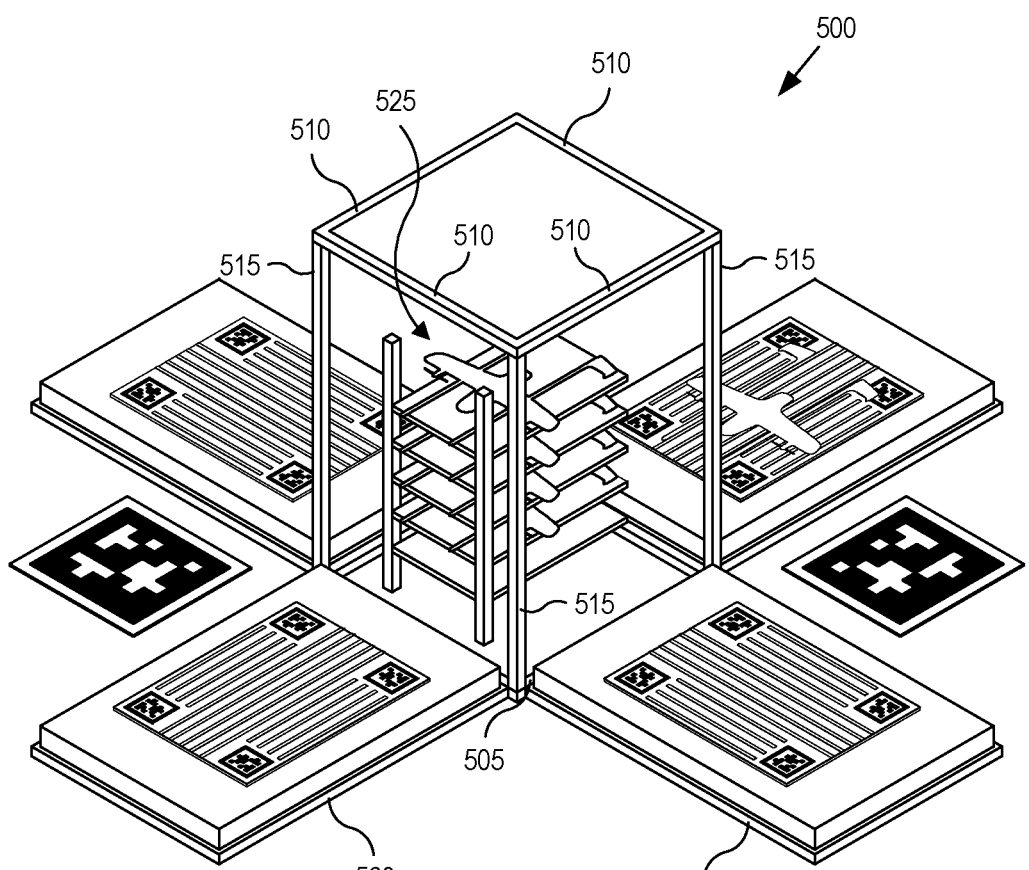

FIGS. 5A and 5B illustrate a mobile nest 500, in accordance with an embodiment of the disclosure. Mobile nest 500 is similar to mobile nest 100 and may include all the features discussed above in connection with mobile nests 100, 300, or 400. Mobile nest 500 includes a cuboid-shape frame formed from lower horizontal supports 505, upper horizontal supports 510, and vertical supports 515. However, the staging pads 110 are disposed on sides 520, which operate as the exterior siding and pivot/fold down about horizontal supports 505 as opposed to pivoting about vertical supports 515. Sides 520 serve as both the exterior weather siding when UAVs 105 are stowed within mobile nest 500 and also serve as a base support for staging pads 110 when folded down into the deployed configuration. One, two, three, or all four sides 520 may be folded down for staging UAVs. UAVs 105 are stored in a stacked configuration on a rack 525 within the cuboid-shape frame when stowed, and repositioned to staging pads 110 when deployed.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A mobile nest for unmanned aerial vehicles (UAVs), comprising:
    a cuboid-shaped frame including vertical supports positioned at corners of the cuboid-shaped frame;
    a plurality of staging pads adapted for landing, launching, and charging the UAVs, wherein the staging pads are mounted to pivot about two or more of the vertical supports, and wherein each of the staging pads rotates into the cuboid-shaped frame when stowed for storing a corresponding one of the UAVs and rotates out of the cuboid-shaped frame when deployed for launching or landing the corresponding one of the UAVs, wherein the vertical supports include sliding guides adapted to allow each of the staging pads to be stowed and deployed at different vertical offsets;
    charging electronics disposed within the cuboid-shaped frame and coupled to the staging pads to charge the UAVs when the UAVs are positioned on the staging pads; and
    exterior siding mounted to the cuboid-shaped frame to provide a weather barrier that protects the UAVs from weather when the UAVs are stowed within the mobile housing structure.

2. The mobile nest of claim 1, wherein the plurality of staging pads includes four staging pads and each of the four staging pads is mounted to pivot about a different one of the vertical supports.

3. The mobile nest of claim 2, wherein each of the four staging pads is mounted to pivot about the different one of the vertical supports at a different vertical offset relative to each other.

4. The mobile nest of claim 2, further comprising:
    a first solar panel disposed on a top of the cuboid-shaped frame, wherein the first solar panel is coupled to the charging electronics to provide solar power to the UAVs when the UAVs are staged on the staging pads.

5. The mobile nest of claim 4, further comprising:
    one or more flaps mounted to one or more corresponding sides of the top of the cuboid-shaped frame, wherein the one or more flaps either flip out or flip up and leave the first solar panel exposed when deployed; and
    one or more secondary solar panels each mounted to a corresponding one of the one or more flaps and coupled to the charging electronics to provide additional solar power to the UAVs when the UAVs are staged on the staging pads.

6. The mobile nest of claim 5, wherein the flaps deploy along sides of the cuboid-shaped frame and the staging pads deploy to diagonal corners of the cuboid-shaped frame between the flaps when the flaps are deployed.

7. The mobile nest of claim 2, wherein the plurality of staging pads includes eight staging pads with two of the eight staging pads being mounted to pivot about each of the vertical supports.

8. The mobile nest of claim 1, further comprising:
flaps each mounted to a corresponding side of a top of the cuboid-shaped frame, wherein the flaps either flip out or flip up; and
visual fiducial markers each mounted to a corresponding one of the flaps, the visual fiducial markers configured as visual navigation aids for the UAVs,
wherein the flaps deploy along sides of the cuboid-shaped frame and the staging pads deploy to diagonal corners of the cuboid-shaped frame between the flaps when the flaps are deployed.

9. The mobile nest of claim 1, further comprising:
a plurality of staging pad brackets that each mount to and support a corresponding one of the staging pads, wherein the staging pad brackets extend from hinges that pivot the staging pads about the vertical supports, and wherein the staging pad brackets form a portion of exterior siding providing the weather barrier for the mobile nest.

10. The mobile nest of claim 1, further comprising:
wheels mounted to the cuboid-shaped frame for trailering the mobile nest to staging locations; or
lifting hooks extending from four top corners of the cuboid-shaped frame for lifting the mobile nest.

11. The mobile nest of claim 1, wherein the staging pads each comprise a first registration feature having a three-dimensional (3D) shape that mates to a corresponding second registration feature on each of the UAVs to locate and secure the UAVs on the staging pads.

12. The mobile nest of claim 1, wherein the mobile nest is stackable.

13. A mobile housing structure for unmanned aerial vehicles (UAVs), comprising:
a housing including vertical supports each positioned at one of four corners of the housing, wherein the housing provides a weather barrier that protects the UAVs from weather when the UAVs are stowed within the mobile housing structure;
a plurality of staging pads adapted for landing, launching, and charging the UAVs, wherein the staging pads are each mounted to pivot about a corresponding one of the vertical supports, and wherein each of the staging pads rotates into the housing when stowed for storing a corresponding one of the UAVs and rotates out of the housing when deployed for launching or landing the corresponding one of the UAVs;
one or more flaps mounted to one or more corresponding sides of a top of the housing, wherein the one or more flaps either flip out or flip up and leave a first solar panel exposed when the one or more flaps are deployed; and
charging electronics disposed within the housing and coupled to the staging pads to charge the UAVs when the UAVs are positioned on the staging pads.

14. The mobile housing structure of claim 13, wherein each of the staging pads is mounted to pivot about a different one of the vertical supports at a different vertical offset relative to each other.

15. The mobile housing structure of claim 14, wherein the vertical supports include sliding guides adapted to allow each of the staging pads to be stowed and deployed at different vertical offsets.

16. The mobile housing structure of claim 13, wherein the first solar panel is disposed on a top of the housing; and coupled to the charging electronics to provide solar power to the UAVs when the UAVs are staged on the staging pads.

17. The mobile housing structure of claim 16, further comprising:
one or more secondary solar panels each mounted to a corresponding one of the one or more flaps and coupled to the charging electronics to provide additional solar power to the UAVs when the UAVs are staged on the staging pads.

18. The mobile housing structure of claim 17, wherein the flaps deploy along sides of the housing and the staging pads deploy to diagonal corners of the housing between the flaps when the flaps are deployed.

19. The mobile housing structure of claim 13, wherein the staging pads each comprise a first registration feature having a three-dimensional (3D) shape that mates to a corresponding second registration feature on each of the UAVs to locate and secure the UAVs on the staging pads.

20. A mobile nest for unmanned aerial vehicles (UAVs), comprising:
a cuboid-shaped frame including horizontal and vertical supports positioned at corners of the cuboid-shaped frame;
a plurality of staging pads adapted for landing, launching, and charging the UAVs, wherein the staging pads are mounted to pivot about two or more of the horizontal or vertical supports, and wherein each of the staging pads rotates into the cuboid-shaped frame when stowed for storing a corresponding one of the UAVs and rotates out of the cuboid-shaped frame when deployed for launching or landing the corresponding one of the UAVs;
charging electronics disposed within the cuboid-shaped frame and coupled to the staging pads to charge the UAVs when the UAVs are positioned on the staging pads; and
exterior siding mounted to the cuboid-shaped frame to provide a weather barrier that protects the UAVs from weather when the UAVs are stowed within the mobile housing structure,
wherein the exterior siding comprises a base support for the staging pads, and wherein the exterior siding pivots about lower ones of the horizontal supports of the cuboid-shaped frame to open the cuboid-shaped frame and expose the UAVs stowed within the mobile nest.

21. The mobile nest of claim 20, wherein the UAVs are stacked on a rack within the cuboid-shaped frame when stowed and repositioned onto the staging pads when deployed.

22. A mobile nest for unmanned aerial vehicles (UAVs), comprising:
a cuboid-shaped frame including vertical supports positioned at corners of the cuboid-shaped frame;
a plurality of staging pads adapted for landing, launching, and charging the UAVs, wherein the staging pads are mounted to pivot about two or more of the vertical supports, and wherein each of the staging pads rotates into the cuboid-shaped frame when stowed for storing a corresponding one of the UAVs and rotates out of the cuboid-shaped frame when deployed for launching or landing the corresponding one of the UAVs;

charging electronics coupled to the staging pads to charge the UAVs when the UAVs are positioned on the staging pads;

exterior siding mounted to the cuboid-shaped frame to provide a weather barrier that protects the UAVs from weather when the UAVs are stowed within the mobile housing structure; and a plurality of staging pad brackets that each mount to and support a corresponding one of the staging pads, wherein the staging pad brackets extend from hinges that pivot the staging pads about the vertical supports, and wherein the staging pad brackets form a portion of exterior siding providing the weather barrier for the mobile nest.

\* \* \* \* \*

UNITED STATES PATENT AND TRADEMARK OFFICE
CERTIFICATE OF CORRECTION

PATENT NO. : 11,794,922 B1
APPLICATION NO. : 17/881438
DATED : October 24, 2023
INVENTOR(S) : E. Twyford et al.

Page 1 of 1

It is certified that error appears in the above-identified patent and that said Letters Patent is hereby corrected as shown below:

In the Claims

In Column 8, Line 10 change "housing;" to -- housing --

Signed and Sealed this
Thirty-first Day of December, 2024

Derrick Brent
*Acting Director of the United States Patent and Trademark Office*